(12) United States Patent  
Shi (10) Patent No.: US 7,814,835 B2  
(45) Date of Patent: Oct. 19, 2010

(54) PROPULSION ENHANCEMENT ARRANGEMENT FOR ROCKET

(76) Inventor: Zhongwei Shi, Room 101, No. 35, Lane 1661, Changning Road, Shanghai (CN) 200051

( * ) Notice: Subject to any disclaimer, the term of this patent is extended or adjusted under 35 U.S.C. 154(b) by 338 days.

(21) Appl. No.: 12/037,085

(22) Filed: Feb. 26, 2008

(65) Prior Publication Data

US 2009/0212163 A1 Aug. 27, 2009

(51) Int. Cl.  
 F42B 15/36 (2006.01)  
 F02K 9/76 (2006.01)

(52) U.S. Cl. ........................ 102/374; 102/378

(58) Field of Classification Search .......... 102/374, 102/380, 378; 60/225, 247, 250; 244/171.1, 244/172.3

See application file for complete search history.

(56) References Cited

U.S. PATENT DOCUMENTS

| | | | | |
|---|---|---|---|---|
| 3,442,084 A | * | 5/1969 | Cramm et al. | 60/250 |
| 3,888,079 A | * | 6/1975 | Diesinger | 60/245 |
| 4,075,832 A | * | 2/1978 | Diesinger et al. | 60/245 |
| 4,930,421 A | * | 6/1990 | Macdonald | 102/377 |
| 4,956,971 A | * | 9/1990 | Smith | 60/245 |
| 5,070,691 A | * | 12/1991 | Smith et al. | 60/245 |
| 5,419,118 A | * | 5/1995 | McSpadden et al. | 60/250 |
| 6,036,144 A | * | 3/2000 | Sisk | 244/171.1 |
| 6,796,242 B2 | * | 9/2004 | Shi | 102/378 |
| 7,000,377 B1 | * | 2/2006 | Knight | 60/225 |
| 7,137,588 B2 | * | 11/2006 | Humphrey | 244/3.15 |
| 7,254,936 B1 | * | 8/2007 | Knight | 60/250 |
| 2004/0144280 A1 | * | 7/2004 | Shi | 102/374 |

* cited by examiner

Primary Examiner—Bret Hayes (57) ABSTRACT

A rocket includes a front warhead, a rear propellant actuator, and a propulsion enhancement arrangement which comprises at least two propulsion impulse generators longitudinally cascadedly mounted between the warhead and the rear propellant actuator, wherein each propulsion impulse generator comprises a storage barrel for storing a predetermined amount of explosive materials to provide propelling impulse upon controlled explosion thereof, and a time-internal control arrangement comprising a time-interval control device mounted on a bottom of the front warhead, a time-interval trigger wire operatively connected with the time-interval control device, and at least two time-interval triggers mounted along the time-interval trigger wire and inside of each of the storage chambers respectively, wherein the time-interval triggers trigger the explosion of the explosive material stored in the storage chamber from the bottom propelling impulse generator to the top propelling impulse generator one by one at a predetermined time intervals, so as to further propels the front warhead to the predetermined position at a predetermined velocity and after each explosion.

16 Claims, 7 Drawing Sheets

PROPULSION ENHANCEMENT ARRANGEMENT FOR ROCKET

BACKGROUND OF THE PRESENT INVENTION

1. Field of Invention

The present invention relates to a rocket, and more particularly to a propulsion enhancement arrangement for a rocket which is capable of substantially increasing the hitting range and acceleration of the rocket without inducing significant weight and fuel consumption thereof.

2. Description of Related Arts

Rockets have widely been used for accomplishing a wide variety of purposes, though most of which are of military nature. Conventionally, rockets can broadly be divided into two distinct types in terms of the principles or source of energy by which they propel when they are launched. The first category is known of a 'self-propellant' type. As the name implies, each of the rockets concerned usually comprises a propeller wherein compressed air is flowed out therefrom so as to, by simple theory of fluid mechanics, 'push' the rocket in a predetermined or targeted direction at a very high speed.

The second category of rockets is those dependent upon an 'external' source of propulsion. What is meant here is that the rockets concerned need to be propelled by a launching device which utilizes highly pressurized air or impulse of controlled combustion to 'push' the rear portions of the rockets so as to accelerate or propel them at an extremely high speed. A distinguishing feature of this kind of rockets is that they generally possess extremely high degree of acceleration when launched.

As one might foresee, the utilization of rockets involves precise control and monitoring of the whole launching and hitting processes which in turn require sophisticated equipments and well-qualified personnel. All these, plus the potential disastrous consequences if the rockets are improperly or unlawfully handled, make the operation both extremely expensive as well as restrictive, i.e. beyond the reach of ordinary people.

Nevertheless, the chase of more effective propulsion methodologies and cheaper operation or manufacturing cost of rockets is still prevailing. The operation implication of the second category of rockets is that a complicated launching device is usually needed to provide satisfactory acceleration and the hitting range of the rockets.

However, the explosive materials can not be utilized as the propulsion at ground, because the explosion will cause catastrophic consequences to the surrounding object and personnel. But if the explosion occurs at a very high place, the explosive wave will disappear soon before transmitting to the ground due to the resistance of the air force. For example, the explosion of the weakest lightening in nature equals to atomic bomb in Hiroshima that equals to the TNT of 20 k tons. If the explosion occurs at high altitude, the explosion is harmless to the people and object at ground.

The present invention serves to substantially overcome the above difficulties so as to provide a more optimal yet novel rocket, indirectly contributing technological advancement of human beings.

SUMMARY OF THE PRESENT INVENTION

A main object of the present invention is to provide a rocket with a propulsion enhancement arrangement that is capable of, when launched, enhancing a hitting range and acceleration thereof as compared with conventional arts of the same kind.

Another object of the present invention is to provide a rocket with a propulsion enhancement arrangement which comprises two or more cascaded propulsion impulse generators, installed between a warhead and a propelling actuator, adapted to generate a controllable propelling impulse to further propel the warhead so as to substantially enhance the hitting range and the acceleration thereof without causing fatal damage to the warhead to fail its mission.

Another object of the present invention is to provide a rocket with a propulsion enhancement arrangement which comprises two or more cascaded propulsion impulse generators, which is capable of exploding at high altitude so as not to harm surrounding people or object at ground.

Another object of the present invention is to provide a rocket with a propulsion enhancement arrangement which can not only enhance the hitting range and acceleration thereof, but also can preserve its accuracy in hitting a predetermined target.

Another object of the present invention is to provide a rocket with a propulsion enhancement arrangement which does not significantly consume more fuel or energy of any forms than the conventional self-propellant rockets.

Another object of the present invention is to provide a rocket with a propulsion enhancement arrangement, wherein the cost of the propulsion enhancement arrangement is inexpensive comparing with the conventional propulsion system, so as to substantially reduce the overall cost of the rocket.

Another object of the present invention is to provide a rocket with a propulsion enhancement arrangement which does not significantly alter the original design of each part of the rocket so as to minimize the manufacturing and related cost of the present invention. Accordingly, the structural design of the propulsion enhancement arrangement is capable of being incorporated with a conventional missile to enhance the performance thereof such as the hitting range.

Accordingly, in order to accomplish the above objects, the present invention provides a rocket, comprising:

a front warhead;

a rear propellant actuator for generating propelling force to propel the warhead in a predetermined orientation and at a predetermined speed; and a propulsion enhancement arrangement which comprises:

at least two propulsion impulse generators longitudinally cascadedly mounted between the warhead and the rear propellant actuator, wherein each propulsion impulse generator comprises:

a storage barrel having a periphery side wall, a bottom wall, and a top ceiling forming a storage chamber therein;

a predetermined amount of explosive material selected from a group consisting of trinitrotoluene which is stored in the storage chamber and enclosed by a foam material to retain a spherical shape in the storage chamber to provide propelling impulse upon controlled explosion thereof, wherein the predetermined amount of explosive material is arranged for propelling the front warhead to a predetermined position; and a time-internal control arrangement comprising a time-interval control device mounted on a bottom of the front warhead, a time-interval trigger wire operatively connected with the time-interval control device, and at least two time-interval triggers mounted along the time-interval trigger wire and inside of each of the storage chambers respectively, wherein a predetermined set of parameters is put into time-interval control device to control a timing and an elevation in air of an explosion that generates a propelling impulse, wherein the time-interval triggers trigger the explosion of the explosive material stored in the storage chamber from the bottom propelling impulse generator to the top propelling impulse generator one by one at a predetermined time intervals, so as to further propels the front warhead to the predetermined position at a predetermined velocity and after each explosion.

These and other objectives, features, and advantages of the present invention will become apparent from the following detailed description, the accompanying drawings, and the appended claims.

DETAILED DESCRIPTION OF THE PREFERRED EMBODIMENT

Figure 1:
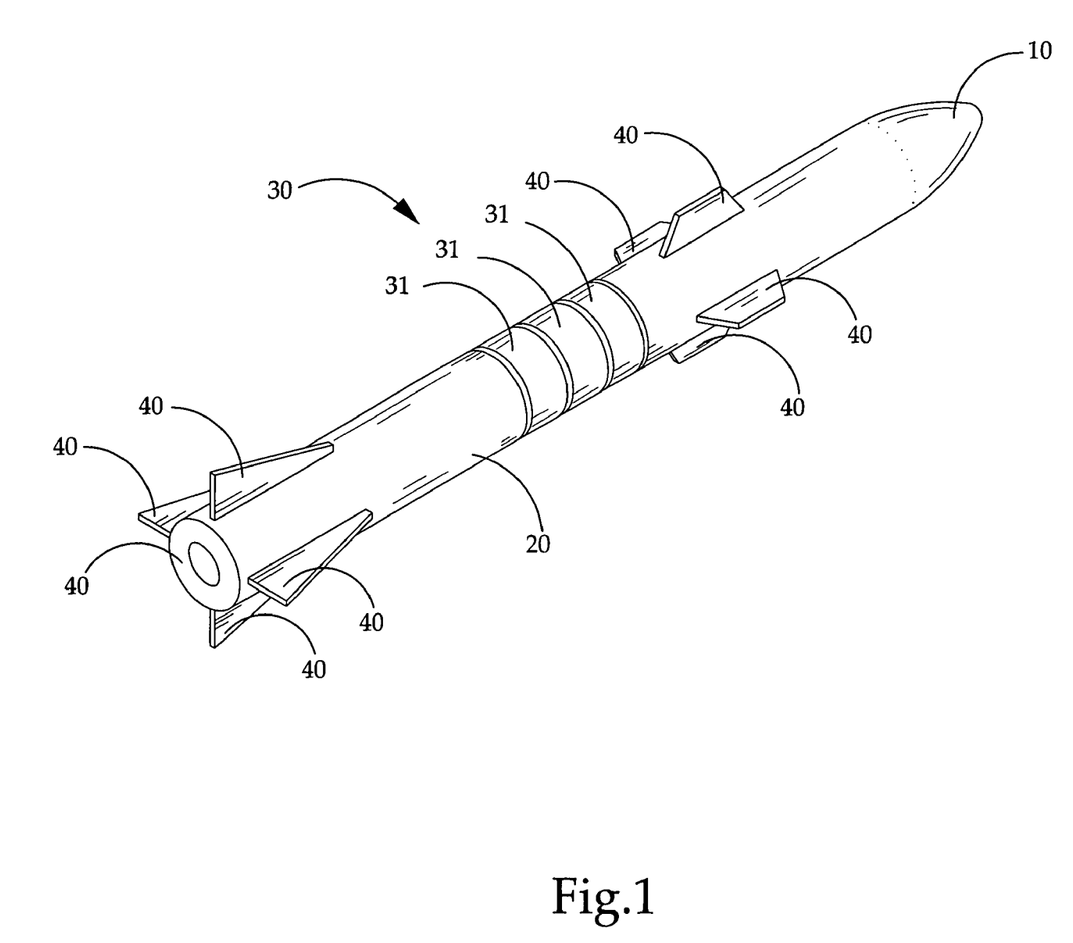
FIG. 1 is a perspective view of a rocket with a propulsion enhancement arrangement according to a preferred embodiment of the present invention.
Figure 2:
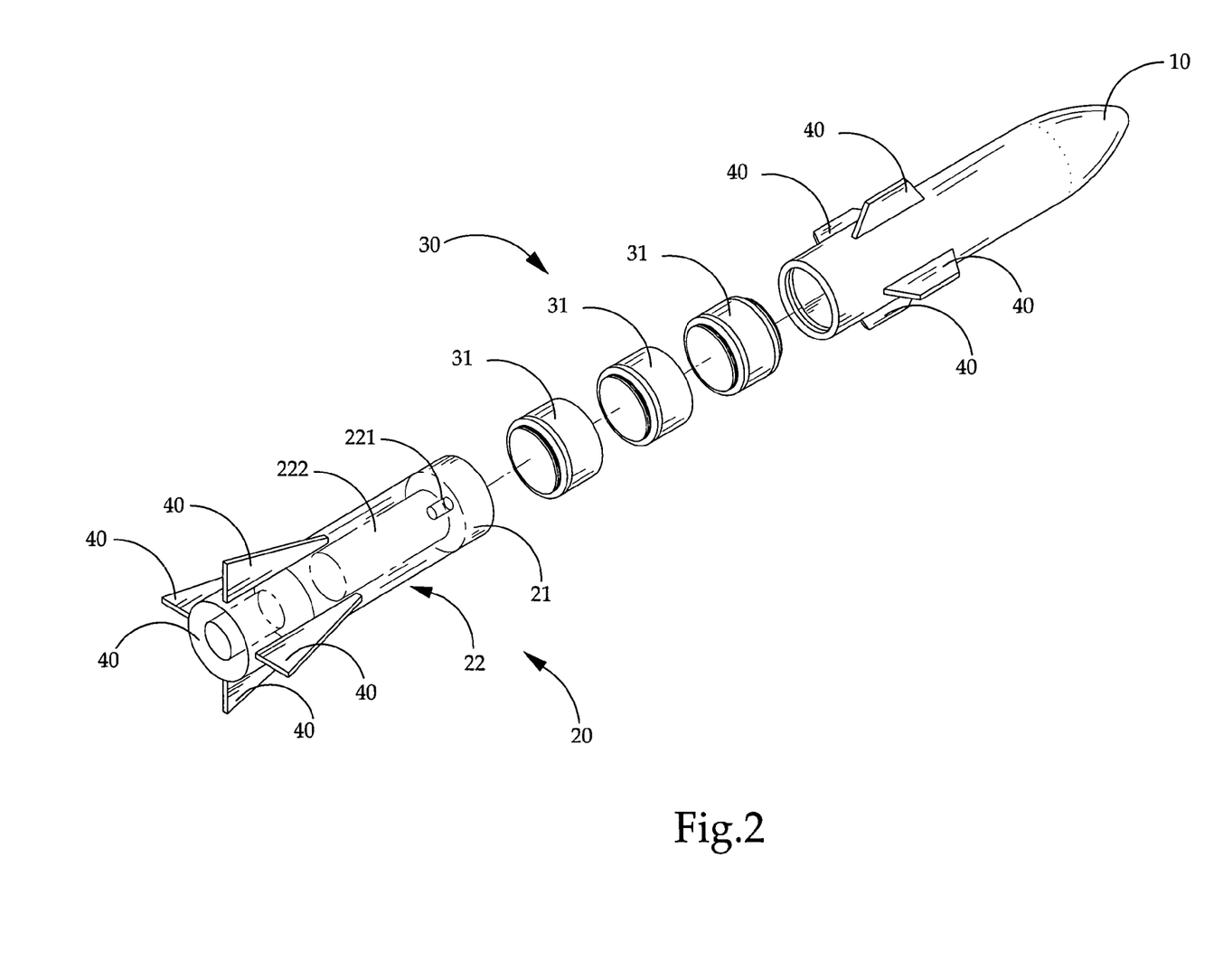
FIG. 2 is an exploded perspective view of a rocket with a propulsion enhancement arrangement according to the above preferred embodiment of the present invention.

Referring to FIGS. 1 to 2 of the drawings, a rocket 1 with a propulsion enhancement arrangement 30 according to a preferred embodiment of the present invention is illustrated. According to the preferred embodiment, the rocket 1 is embodied as a self-propellant type rocket and is capable of being launched by a conventional rocket launching platform. The rocket 1 comprises a front warhead 10, a rear propellant actuator 20, and a propulsion enhancement arrangement 30.

The warhead 10 has a predetermined amount of explosive materials securely received therein, wherein the explosive materials are capable of being triggered to explode so as to destroy the objects being targeted by a launcher of the rocket 1. The explosive materials, according to the preferred embodiment, can be those of conventionally used in the warhead of the conventional and regular rocket.

The propellant actuator 20 is positioned at a rear side of the warhead 10 for propelling the rocket 1 to move in a predetermined orientation. Technically, the propellant actuator 20 comprises a combustion chamber 21 fuelled with a predetermined amount of propelling fuel. According to the preferred embodiment, the propellant fuel can take the form of particulates of inorganic oxidizer such as ammonium perchlorate, aluminum powder fuel, or alternatively, it can take the form of fluid polymer fuel, such as, an uncured, liquid carboxy terminated polybutadiene.

The propelling actuator 20 further comprises an ignition system 22 comprising a fuel igniter 221 provided on the combustion chamber 21 for igniting the propelling fuel stored therein, and a pressurized gas generator 222 operatively connected with the combustion chamber 21 and energized by the fuel stored in the combustion chamber 21 upon a series of controlled combustions so as to generate high pressurized gas to propel the rocket 1.

Accordingly, the propelling actuator 20 further comprises a gas propelling nozzle 23 communicated with the pressurized gas generator 222 wherein highly pressurized gas generated from the pressurized gas generator 222 is ejected via the gas propelling nozzle 23 so as to propel the rocket 1 at a predetermined speed and orientation. The predetermined speed should be extremely high to facilitate effective accomplishment a mission of the rocket 1 of the present invention.

Figure 3:
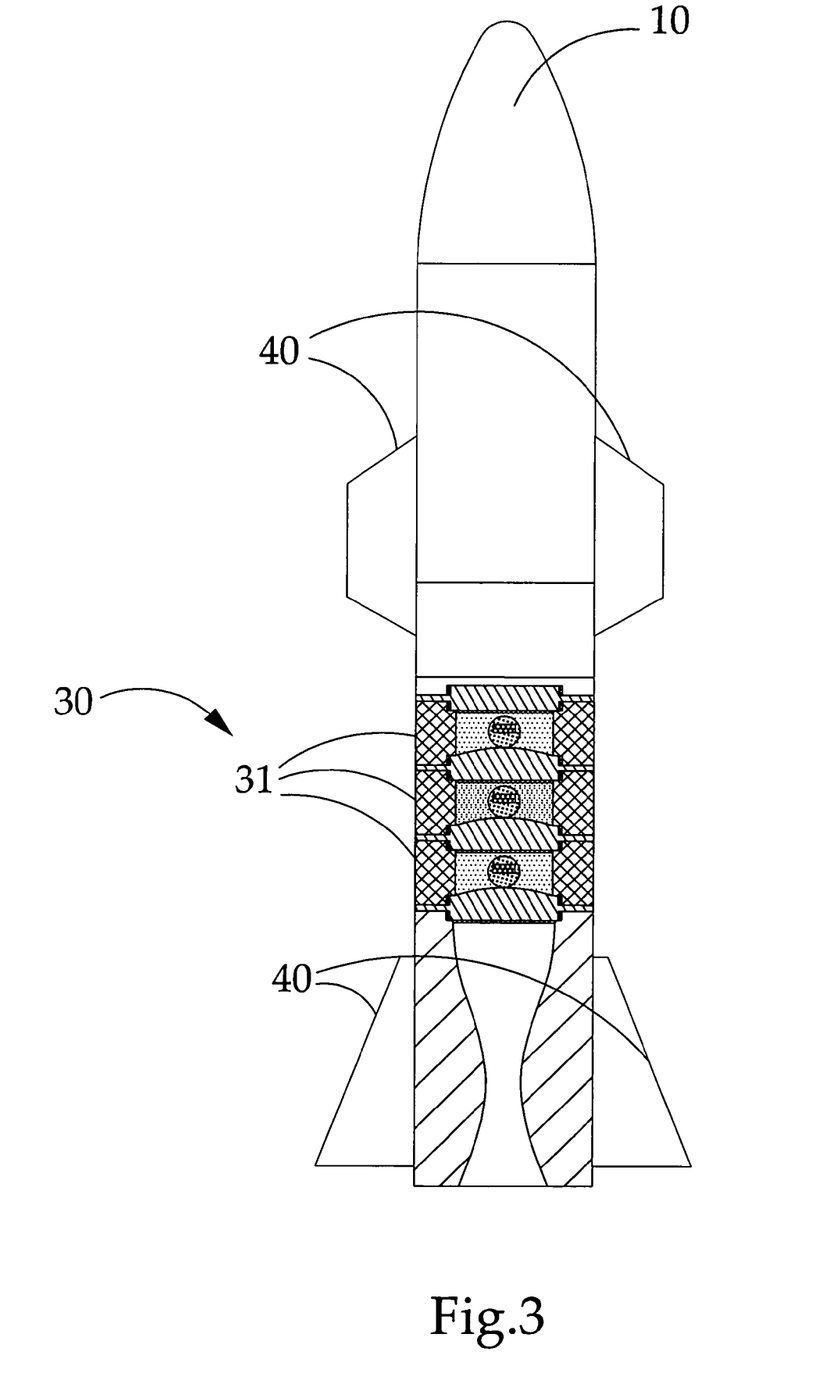
FIG. 3 is a sectional side view of a rocket with a propulsion enhancement arrangement according to the preferred embodiment of the present invention.
Figure 4:
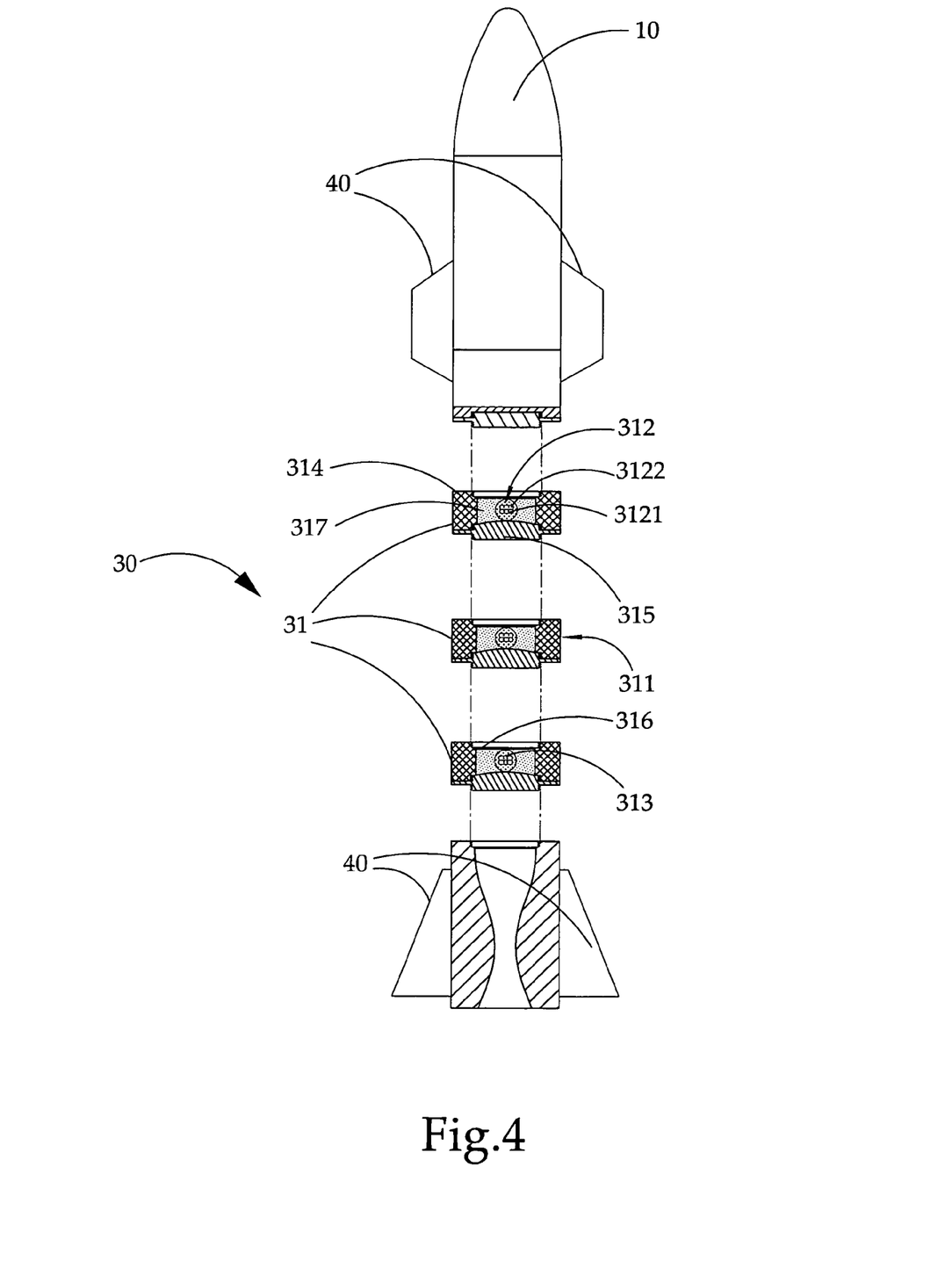
FIG. 4 is an exploded sectional side view of a rocket with a propulsion enhancement arrangement according to the above preferred embodiment of the present invention.

Referring to FIGS. 2, 3 and 4 of the drawings, the propulsion enhancement arrangement 30 comprises at least two propulsion impulse generators 31 longitudinally cascadedly mounted between the front warhead 10 and the rear propellant actuator 20. Here take three propulsion impulse generators 31 as an example, which means a first propulsion impulse generator is placed under the second propulsion impulse generator, and the second propulsion impulse generator is placed under the third propulsion impulse generator. And the first propulsion impulse generator is placed above the rear propellant actuator 20, and the third propulsion impulse generator is place under the front warhead 10. In turn, each propulsion impulse generator 31 comprises a tubular shaped storage barrel 311, having a periphery side wall 314, a bottom wall 315, and a top ceiling 316 forming a storage chamber 317 therein.

The periphery side wall 314 extends upwardly forming a tubular valley above the top ceiling 316. The fragment of the periphery side wall 314 above the top ceiling 216 has inner threaded wall 318 at an inner side of the periphery side wall 314. The bottom wall 315 extends downwardly to protrude beyond a bottom end of the periphery side wall 314. The protruding part of the bottom wall 315 has an outer thread wall 319, which is adapted for matching the inner threaded wall 318 at an inner side of the periphery side wall 314, so that one propulsion impulse generator 31 can fastened to the bottom of another propulsion impulse generator 31 above the first mentioned propulsion impulse generator. Then two or more propulsion impulse generator 31 can be attached one by one, so as to be mounted between the front warhead 10 and the rear propellant actuator 20.

Moreover, the bottom wall of the storage barrel is thicker in centre comparing to the thickness of the bottom wall at edge. The storage chamber is arranged to store a predetermined amount of explosive materials 313 to provide propelling impulse upon controlled explosion thereof. According to the preferred embodiment, the explosive materials 313 should be of highly explosive property, such as trinitrotoluene $[C_7H_5(NO_2)_3]$ (TNT).

As shown in FIG. 4, the explosive materials 313 is stored in the storage chamber 317 in a spherical shape and enclosed by foam material to retain the position of the explosive materials 313 in the storage chamber 317. Accordingly, the volume of the spherical shaped explosive materials 313 is approximately 606 $cm^3$ and a diameter thereof is approximately 5.83 cm, and a density of the explosive materials 313 is approximately 1.65 $g/cm^3$.

Each of the propulsion impulse generator 31 further comprises a time-sensitive trigger device 312 operatively communicated with the storage chamber 317, wherein the time sensitive trigger device 312 comprises a timing device 3121 and an ignition trigger 3122 operatively communicated with each other in such a manner that the ignition trigger 3122 is arranged to ignite the explosive materials 313 stored inside the storage chamber 317 at a particular predetermined time which is pre-set to the timing device 3121. The time-sensitive trigger device 312 is embodied to be mounted inside the storage chamber 317 within the explosive materials 313.

In order to let the explosive material 313 inside the storage chamber 317 to explode at a high latitude, a particular predetermined time is pre-set to the timing device 3121, which means that the explosive material 313 will explode after the particular predetermined time. During the particular predetermined time, the rocket will has reached high latitude, so as to do no harm to the surrounding people and object at ground.

The rocket rather than being destroyed or functionally damaged, is further accelerated and propelled by a propelling impulse generated by the explosion at a predetermined velocity, i.e. a predetermined speed and orientation. In other words, the effect of the explosion is controlled such that the impulse arising from the explosive form the propelling impulse for further propelling the front warhead 10 at an enhanced acceleration without inducing any significant functional damage to the front warhead 10.

Accordingly, the first predetermined time is pre-set to the timing device 3121 of the first propulsion impulse generator 31 at the bottom of the propulsion enhancement arrangement 30 above the rear propellant actuator 20. A second predetermined time, which is longer than the first predetermined time, is pre-set to the timing device 3121 of the second propulsion impulse generator 31, so that after the first propulsion impulse generator 31 explodes for a while, the second propulsion impulse generator 31 explodes for further propelling the rocket, and so on and so forth. A third predetermined time, which is longer than the second predetermined time, is pre-set to the timing device 3121 of the third propulsion impulse generator 31, so that after the second propulsion impulse generator 31 explodes for a while, the third propulsion impulse generator 31 explodes for further propelling the rocket.

Figure 5:
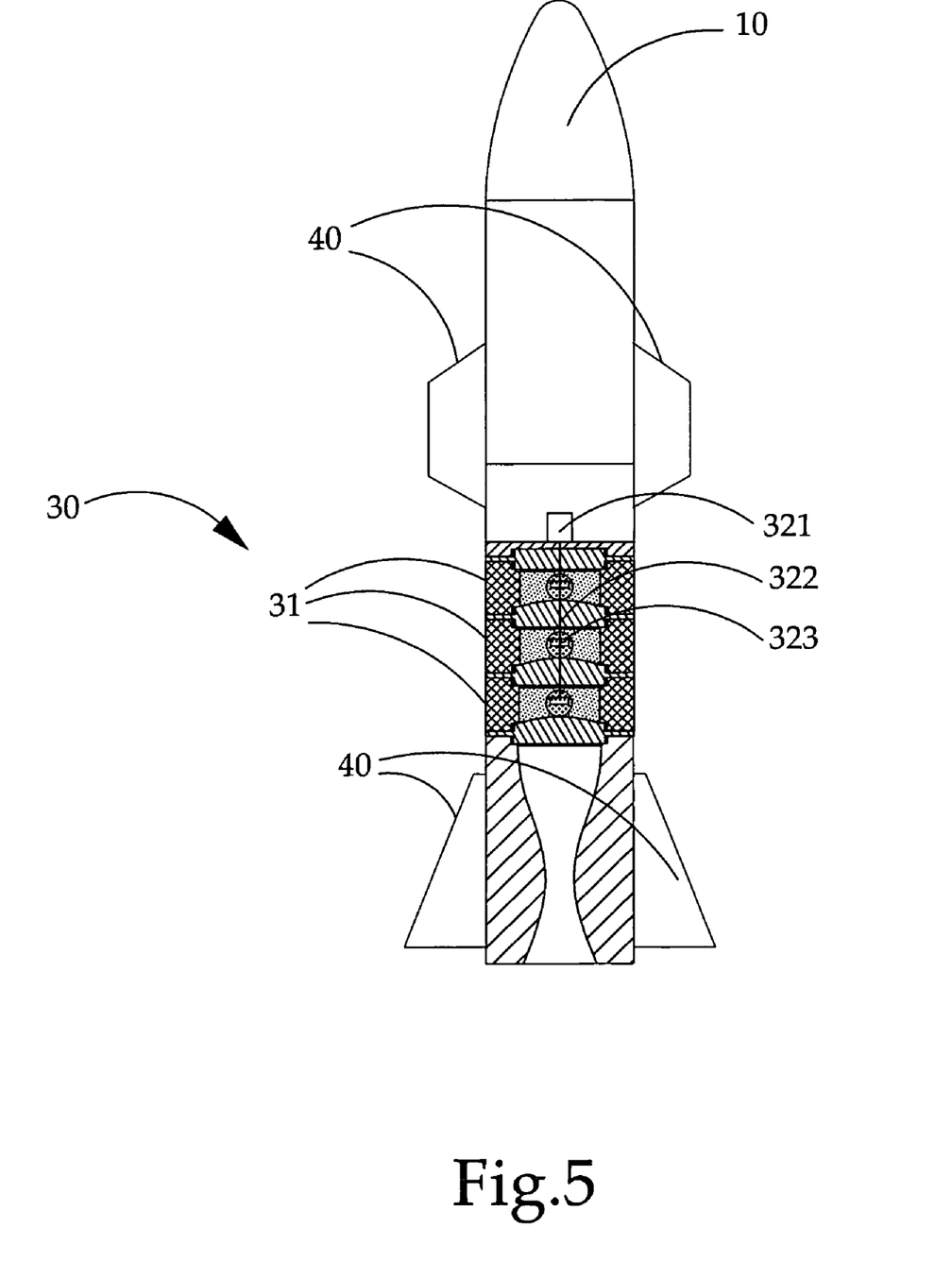
FIG. 5 is a sectional side view of an alternative mode of a rocket with a propulsion enhancement arrangement according to the preferred embodiment of the present invention.
Figure 6:
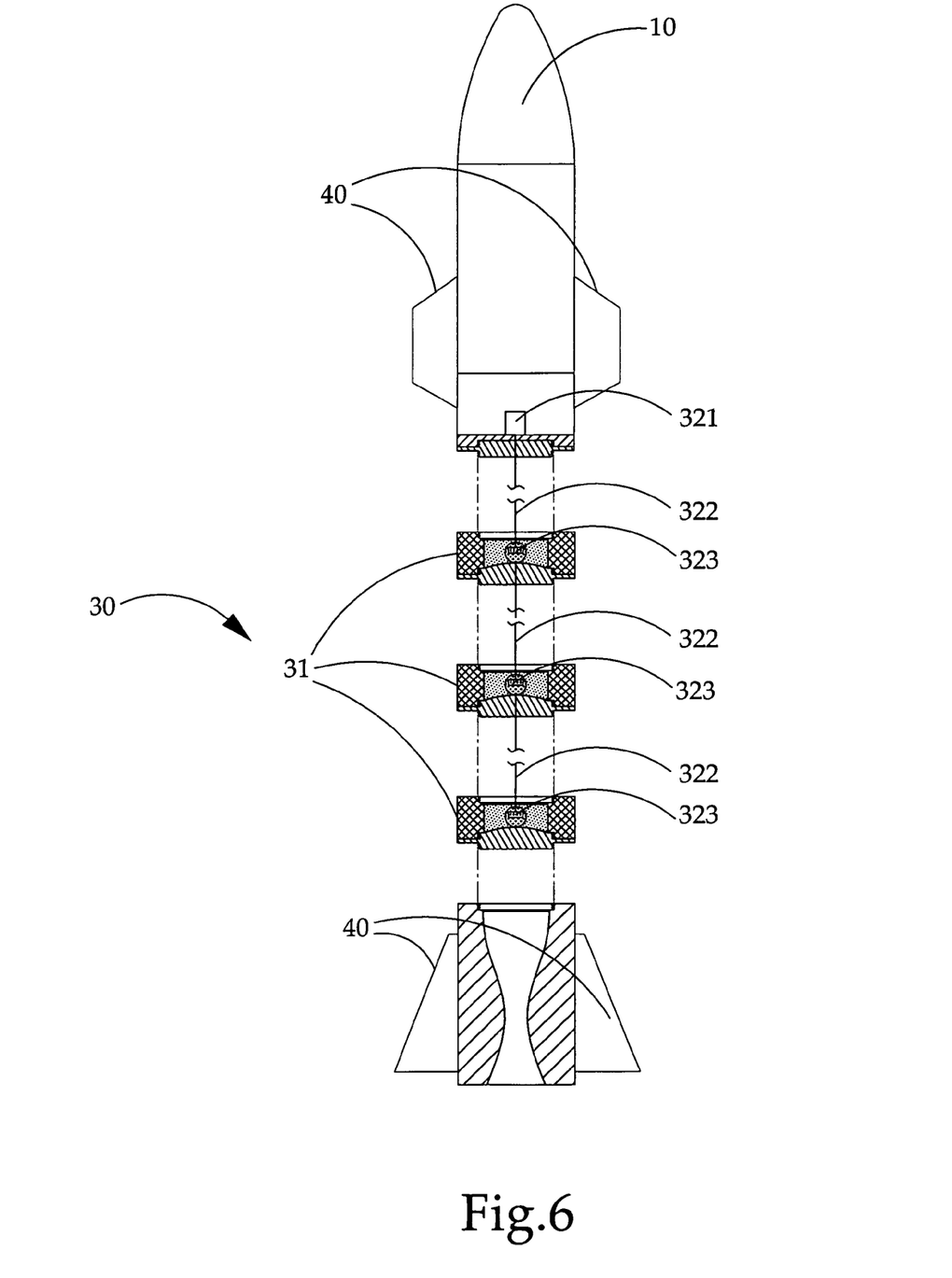
FIG. 6 is an exploded sectional side view of the above alternative mode of a rocket with a propulsion enhancement arrangement according to the above preferred embodiment of the present invention.
Figure 7:
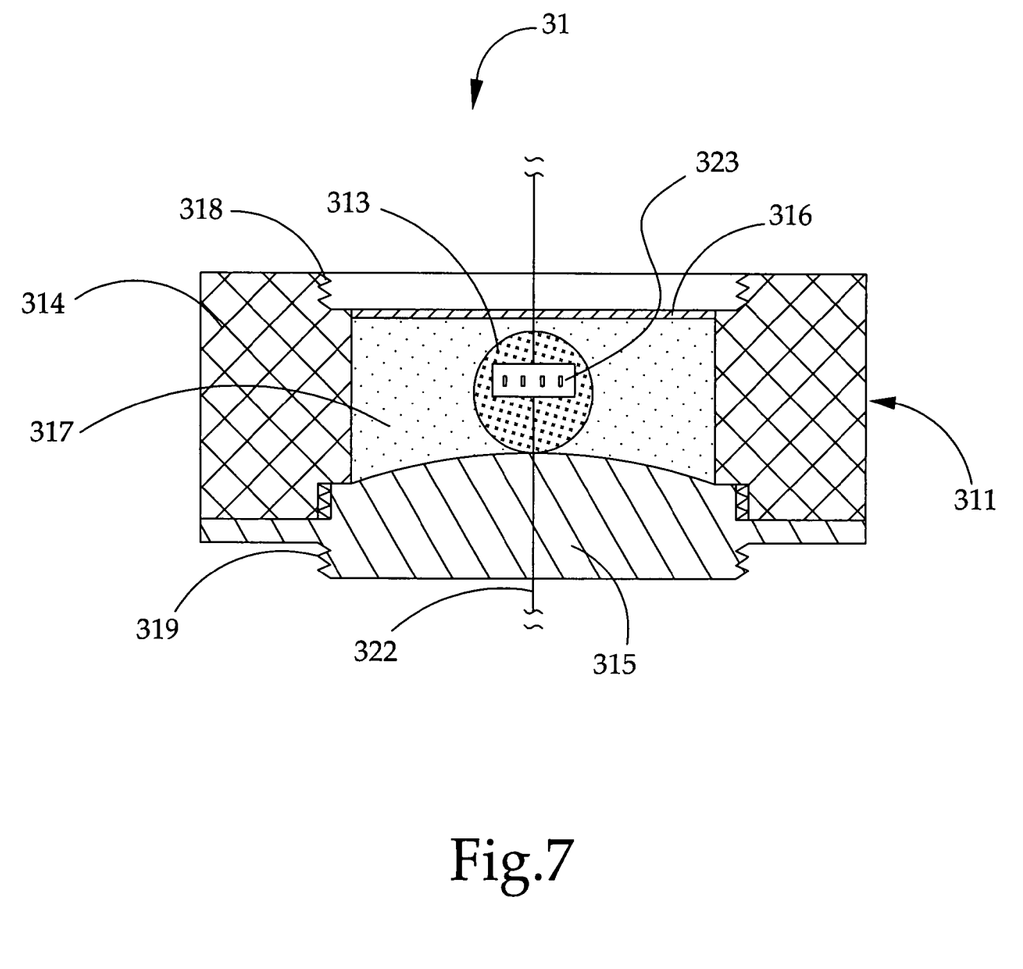
FIG. 7 is an enlarged view of the propulsion impulse generator of the above alternative mode of a rocket with a propulsion enhancement arrangement according to the above preferred embodiment of the present invention.

Alternatively, referring to FIGS. 5, 6, and 7 of the drawings, the propulsion enhancement arrangement 30 comprises a time-interval control arrangement 32 comprising a time-interval control device 321 mounted on a bottom of the front warhead 10, a time-interval trigger wire 322 operatively connected with the time-interval control device 321, and at least two time-interval triggers 323 mounted along the time-interval trigger wire 322 and inside of each of the storage chambers 317 respectively. According to this preferred embodiment, the propulsion enhancement arrangement 30 comprises three time-interval triggers 323 mounted inside three storage chambers 317 respectively.

After the rocket is fired, such as after a 0.1-1 s, the time-interval control device 321 sends a signal to the first time-interval trigger 323 in the first storage chamber via the time-interval trigger wire 322 to explode the first propulsion impulse generator 31. After the first propulsion impulse generator explodes for 0.1-1 s, the time-interval control device 321 sends a signal to the second time-interval trigger 323 in the second storage chamber via the time-interval trigger wire 322 to explode the second propulsion impulse generator 31. After the second propulsion impulse generator explodes for 0.1-1 s, the time-interval control device 321 sends a signal to the third time-interval trigger 323 in the third storage chamber via the time-interval trigger wire 322 to explode the third propulsion impulse generator 31. Therefore, all the propulsion impulse generators 31 explode step by step for further propelling the front warhead 10 to a desire position.

Thus, it is worth accentuating that one skilled in the art would appreciate during the final journey of the front warhead 10, that is, from the point of explosion of the propulsion impulse generator 31 to the targeted object, it no longer requires fuel to be propelled, and that the propelling impulse generated by the explosion is capable of providing the warhead 10 sufficient, and actually enhanced, acceleration and speed at a well-defined orientation in relation to the targeted object.

In order to enhance the accuracy and controllability of the rocket 1, the rocket 1 should further comprises a plurality of stabilizing fins 40 outwardly and radially extended from the front warhead 10 and the propellant actuator 20 respectively in such a manner that they are capable of balancing the aerodynamics forces acting on the rocket 1 while it is in the air on the way to the targeted object. The stabilizing fins 40 are embodied to be made in accordance with the conventional fluid mechanics and aerodynamics theories.

The rocket 1 further comprises a stabilizing fin controller 50 mounted at a rear side of the warhead 10 for adjusting an angle of each of the stabilizing fins 40 at the warhead 10 so as to precisely directing the warhead 10 towards the targeted object.

Referring to FIGS. 4 and 6 of the drawings, the operation of the rocket 1 of the present invention is as follows:

Prior to the launching of the rocket 1, a predetermined set of parameters is input into each of the propulsion impulse generator 31 as to control the timing and elevation of the explosion that generate the propelling impulse, it is also at this stage which determines the amount of explosive materials 313 used for propelling the front warhead 10 to a desire position, taken in account the position and the nature of the targeted objects.

Then, the rocket 1 can be launched by a conventional rocket launching platform at a predetermined orientation and at a predetermined speed. Depending on the inputted parameters of the rocket 1, when the rocket 1 has been reached at a predetermined elevation in the air, which is equivalent to a particular time after launching, the time-sensitive trigger device of the first propulsion impulse generator 31 will then trigger an explosion of the explosive material stored inside the storage chamber.

The explosion will detach the threaded connection between the first propulsion impulse generator and the second propulsion impulse generator, and then generate the propelling impulse which further propels the bottom wall of the second propulsion impulse generator 31. It is worth mentioning that the propelling impulse is further strengthened by the peripheral side wall of the first tubular shaped storage barrel 311. After the explosion, the rear propellant actuator and the exploded first propelling impulse generator then of little practical importance will naturally fall down from the air where the explosion has taken place.

Then after a predetermined time period, the time-sensitive trigger device of the second propulsion impulse generator 31 will then trigger an explosion of the explosive material stored inside the storage chamber. The explosion will detach the threaded connection between the second propulsion impulse generator and the third propulsion impulse generator, and then generate the propelling impulse which further propels the bottom wall of the third propulsion impulse generator 31. It is worth mentioning that the propelling impulse is further strengthened by the peripheral side wall of the second tubular shaped storage barrel 311. After the explosion, the exploded second propelling impulse generator will naturally fall down from the air where the explosion has taken place.

Then after a predetermined time period, the time-sensitive trigger device of the third propulsion impulse generator 31 will then trigger an explosion of the explosive material stored inside the storage chamber. The explosion will detach the threaded connection between the third propulsion impulse generator and the front warhead 10, and then generate the propelling impulse which further propels the front warhead 10 to the targeted object. It is worth mentioning that the propelling impulse is further strengthened by the peripheral side wall of the third tubular shaped storage barrel 311. After the explosion, the exploded third propelling impulse generator will naturally fall down from the air where the explosion has taken place.

The stabilizing fin 40 which is extended form the warhead 10 still balances the various aerodynamics forces acting on the warhead 10 until it hit the target. On the other hand, According to the preferred embodiment of the present invention, the first explosion preferably takes place at 200 m elevation with respect to the launching level, the second explosion preferably takes place at 200 m elevation higher than the elevation of the first explosion, and the third explosion preferably takes place at 200 m elevation higher than the elevation of the second explosion.

As an illustration, a set of figures from the operation of the rocket 1 of present invention is extracted and quoted below: given the hitting range of the original rocket is 180 km, cursing speed is 1800 m/s, and the weight of the warhead is 150 kg. When the propulsion enhancement arrangement is utilized, with approximately 1 kg of explosive materials 313, wherein the explosive materials 313 being TNT which has a potential energy of 1000 cal/g, then, the hitting range of the rocket can be enhanced to 3500 km with cursing speed of 5000 m/s. As a matter of fact, the hitting range of the rocket 1 can be enhanced to between 300 km to 10000 km, depending on the various parameters governing the launching of the rocket 1 and the explosion of the explosive materials 313 of the storage chamber 317 of the propulsion impulse generator 31.

It is worth to mention that the weight of the conventional propulsion system is at least 90% of the overall weight of the rocket. The performance of the rocket will be minimized because of the heavy weight of the conventional propulsion system. Accordingly, the weight of the propulsion enhancement arrangement 30 of the present invention is approximately 10% of the overall weight of the rocket 1 such that when the rocket 1 is employed with the propulsion enhancement arrangement 30, the weight of the rocket 1 can be substantially reduced so as to enhance the hitting range and the acceleration of the rocket 1.

In addition, the propulsion enhancement arrangement 30 can be incorporated with a missile to enhance the performance of the missile such as the hitting distance and the acceleration. Accordingly, the hitting range of the missile is longer than that of the rocket so that the missile may require a lighter and powerful propulsion system. Therefore, the propulsion enhancement arrangement 30 can be incorporated with the conventional missile, especially the short distance missile, to obtain a better performance while being cost effective.

From the forgoing elaborations of the present invention, one skilled in the art should be able to appreciate that the rocket 1 is capable of substantially accomplishing the objects stated. Furthermore, the applicability of the propulsion enhancement arrangement 30 shouldn't be limited to those rockets 1 in which air is the medium of their application. Conceivably, the propulsion enhancement arrangement 30 can also be adopted to incorporate into other kinds of explosive constructions such as torpedoes rockets of various kinds, and the likes.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A rocket, comprising:

a front warhead;

a rear propellant actuator for generating propelling force to propel said front warhead in a predetermined orientation and at a predetermined speed; and a propulsion enhancement arrangement which comprises:

at least two propulsion impulse generators longitudinally cascadedly mounted between said front warhead and said rear propellant actuator, wherein each propulsion impulse generator comprises:

a storage barrel having a periphery side wall, a bottom wall, and a top ceiling forming a storage chamber therein, wherein one propulsion impulse generator is adapted to be mounted on another propulsion impulse generator, so that all propulsion impulse generators are connected together to be mounted between said front warhead and said rear propellant actuator;

a predetermined amount of explosive material selected from a group consisting of trinitrotoluene which is stored in said storage chamber and enclosed by a foam material to retain a spherical shape in said storage chamber to provide propelling impulse upon controlled explosion thereof, wherein said predetermined amount of explosive material is arranged for propelling said front warhead to a predetermined position; and a time-interval control arrangement comprising a time-interval control device mounted on a bottom of said front warhead, a time-interval trigger wire operatively connected with said time-interval control device, and at least two time-interval triggers mounted along said time-interval trigger wire and inside of each of said storage chambers respectively, wherein a predetermined set of parameters is put into said time-interval control device to control a time interval of a first explosion and following explosions, wherein said time interval generates a propelling impulse, wherein said time-interval triggers trigger an explosion of said explosive material stored in said storage chamber from said propelling impulse generator in bottom to said propelling impulse generator in top one by one at a predetermined time interval, so as to further propel said front warhead to a predetermined position at a predetermined velocity after each explosion, wherein said periphery side wall extends upwardly forming a tubular valley above said top ceiling, said tubular valley above said top ceiling has an inner threaded wall at an inner side of said periphery side wall, and said bottom wall extends downwardly to protrude beyond a bottom end of said periphery side wall, said protruding part of said bottom wall has an outer thread wall, which is adapted for matching said inner threaded wall at said inner side of said periphery side wall, so that one propulsion impulse generator is capable of mounting on another propulsion impulse generator by threaded connection, wherein said explosion detaches said threaded connection between said bottom wall of said propulsion impulse generator which is exploding and said periphery side wall, and then generates said propelling impulse which further propels said rocket, wherein said propelling impulse is further strengthened by said peripheral side wall of said propulsion impulse generator which is exploding, wherein said peripheral side wall is tubular shaped to guide bursted gas.

2. The rocket, as recited in claim 1, wherein said time interval is 0.1-1 s.

3. The rocket, as recited in claim 2, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

4. The rocket, as recited in claim 1, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

5. A propulsion enhancement system for a rocket comprising a front warhead and a propellant actuator adapted for propelling said warhead, wherein said propulsion enhancement system comprises:

at least two propulsion impulse generators longitudinally cascadedly mounted between said front warhead and said rear propellant actuator, wherein each propulsion impulse generator comprises:

a storage barrel having a periphery side wall, a bottom wall, and a top ceiling forming a storage chamber therein, wherein one propulsion impulse generator is adapted to be mounted on another propulsion impulse generator, so that all propulsion impulse generators are connected together to be mounted between said front warhead and said rear propellant actuator;

a predetermined amount of explosive material selected from a group consisting of trinitrotoluene which is stored in said storage chamber and enclosed by a foam material to retain a spherical shape in said storage chamber to provide propelling impulse upon controlled explosion thereof, wherein said predetermined amount of explosive material is arranged for propelling said front warhead to a predetermined position; and a time-interval control arrangement comprising a time-interval control device mounted on a bottom of said front warhead, a time-interval trigger wire operatively connected with said time-interval control device, and at least two time-interval triggers mounted along said time-interval trigger wire and inside of each of said storage chambers respectively, wherein a predetermined set of parameters is put into said time-interval control device to control a time interval of a first explosion and following explosions, wherein said time interval generates a propelling impulse, wherein said time-interval triggers trigger an explosion of said explosive material stored in said storage chamber from said propelling impulse generator in bottom to said propelling impulse generator in top one by one at a predetermined time interval, so as to further propel said front warhead to a predetermined position at a predetermined velocity after each explosion, wherein said periphery side wall extends upwardly forming a tubular valley above said top ceiling, said tubular valley above said top ceiling has an inner threaded wall at an inner side of said periphery side wall, and said bottom wall extends downwardly to protrude beyond a bottom end of said periphery side wall, said protruding part of said bottom wall has an outer thread wall, which is adapted for matching said inner threaded wall at said inner side of said periphery side wall, so that one propulsion impulse generator is capable of mounting on another propulsion impulse generator by threaded connection, wherein said explosion detaches said threaded connection between said bottom wall of said propulsion impulse generator which is exploding and said periphery side wall, and then generates said propelling impulse which further propels said rocket, wherein said propelling impulse is further strengthened by said peripheral side wall of said propulsion impulse generator which is exploding, wherein said peripheral side wall is tubular shaped to guide bursted gas.

6. The rocket, as recited in claim 5, wherein said time interval is 0.1-1 s.

7. The rocket, as recited in claim 6, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

8. The rocket, as recited in claim 5, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

9. A rocket, comprising:

a front warhead;

a rear propellant actuator for generating propelling force to propel said front warhead in a predetermined orientation and at a predetermined speed; and a propulsion enhancement arrangement which comprises:

at least two propulsion impulse generators longitudinally cascadedly mounted between said front warhead and said rear propellant actuator, wherein one propulsion impulse generator is adapted to be mounted on another propulsion impulse generator, so that all propulsion impulse generators are connected together to be mounted between said front warhead and said rear propellant actuator, wherein a predetermined set of parameters is put into each of said propulsion impulse generator to control a timing and an elevation in air of an explosion that generates a propelling impulse, wherein each propulsion impulse generator comprises:

a storage barrel having a periphery side wall, a bottom wall, and a top ceiling forming a storage chamber therein; and a predetermined amount of explosive material selected from a group consisting of trinitrotoluene which is stored in said storage chamber and enclosed by a foam material to retain a spherical shape in said storage chamber to provide propelling impulse upon controlled explosion thereof, wherein said predetermined amount of explosive material is arranged for propelling said front warhead to a predetermined position; and a time-sensitive trigger device operatively communicated with said storage chamber, wherein said time sensitive trigger device comprises a timing device and an ignition trigger operatively communicated with each other in order to ignite said explosive material stored in said storage chamber at a predetermined time pre-set to said timing device, wherein said predetermined time pre-set to said timing device of said propulsion impulse generator lower is shorter than said predetermined time pre-set to said timing device of said propulsion impulse generator above, so that when said rocket reaches a timing and elevation in air according to said predetermined set of parameters inputted, said time-sensitive trigger of said propulsion impulse generator on a bottom triggers said explosion of said explosive material stored in said storage chamber, said rear propellant actuator and said propelling impulse generator are separated from said above propelling impulse generator, and one and another, until all said propulsion impulse generator explode, a last propulsion impulse generator are separated from said front warhead, wherein each explosion generates said propelling impulse which further propels said front warhead to said predetermined position at a predetermined velocity after said explosion, wherein said periphery side wall extends upwardly forming a tubular valley above said top ceiling, said tubular valley above said top ceiling has an inner threaded wall at an inner side of said periphery side wall, and said bottom wall extends downwardly to protrude beyond a bottom end of said periphery side wall, said protruding part of said bottom wall has an outer thread wall, which is adapted for matching said inner threaded wall at said inner side of said periphery side wall, so that one propulsion impulse generator is capable of mounting on another propulsion impulse generator by threaded connection, wherein said explosion detaches said threaded connection between said bottom wall of said propulsion impulse generator which is exploding and said periphery side wall, and then generates said propelling impulse which further propels said rocket, wherein said propelling impulse is further strengthened by said peripheral side wall of said propulsion impulse generator which is exploding, wherein said peripheral side wall is tubular shaped to guide bursted gas.

10. The rocket, as recited in claim 9, wherein said time-interval trigger is mounted inside said storage chamber within said explosive material.

11. The rocket, as recited in claim 10, wherein said time interval is 0.1-1 s.

12. The rocket, as recited in claim 11, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

13. The rocket, as recited in claim 10, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

14. The rocket, as recited in claim 9, wherein said time interval is 0.1-1 s.

15. The rocket, as recited in claim 14, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

16. The rocket, as recited in claim 9, said bottom wall of said storage barrel is thicker in centre comparing to a thickness of said bottom wall at edge, in such a manner that said bottom wall avoids being destroyed but is detached from said threaded connection by said explosion, so as to strengthen said propelling impulse by said peripheral side wall which is tubular shaped.

* * * * *